United States Patent [19]

Hermann et al.

[11] Patent Number: 4,812,979

[45] Date of Patent: Mar. 14, 1989

[54] METHOD AND APPARATUS FOR ANALYZING THE PERFORMANCE OF THE ELECTRONIC IGNITION OF AN INTERNAL COMBUSTION ENGINE

[75] Inventors: Horst Hermann, Oberasbach; Wilhelm Binöder, Veitsbronn; Armin Rech; Gerd Rech, both of Heusweiler; Günter Reinhardt, Zirndorf, all of Fed. Rep. of Germany

[73] Assignee: Horst Hermann Company, Fed. Rep. of Germany

[21] Appl. No.: 829,222

[22] Filed: Feb. 14, 1986

[30] Foreign Application Priority Data

Feb. 16, 1985 [DE] Fed. Rep. of Germany ....... 3505440

[51] Int. Cl.⁴ ...................... G01M 15/00; F02P 17/00
[52] U.S. Cl. ............................. 364/431.01; 73/117.3; 324/384; 364/551.01
[58] Field of Search ...................... 364/431.01, 431.08, 364/551, 424; 340/52 F; 324/384, 391, 392; 73/117.2, 117.3, 116

[56] References Cited

U.S. PATENT DOCUMENTS

| | | | |
|---|---|---|---|
| 3,972,230 | 8/1976 | Hanson et al. | 364/431.01 |
| 4,125,894 | 11/1978 | Cashel et al. | 364/424 |
| 4,145,746 | 3/1979 | Trussell et al. | 364/424 |
| 4,295,363 | 10/1981 | Buck et al. | 73/117.3 |
| 4,398,259 | 8/1983 | Levine | 73/117.3 |
| 4,472,779 | 9/1984 | Marino et al. | 364/431.01 |
| 4,476,531 | 10/1984 | Marino et al. | 73/117.3 |

OTHER PUBLICATIONS

Putz, "Einf. i.d., Electronik", Fischer, Feb. 1984, pp. 105–107.

Heck, "Prufstandsautomatisierung Mit Prozessrechnern", Presented at Second International Symposium on Automation of Engine and Emission Testing; 26–28, Sep. 1973, Queen Mary College, London.

Primary Examiner—Felix D. Gruber
Attorney, Agent, or Firm—Bacon & Thomas

[57] ABSTRACT

A method and apparatus for the operational state analysis of internal combustion engines with electrical ignition systems wherein, following any deviation from normal engine operation, the cause of the deviation is determined and localized in the engine. Provision is made first to ascertain with good time resolution a numerical value of speed by measuring the time interval between two consecutive ignition pulses of different cylinders and then to determine a second numerical value which includes both the count of the number of ignition pulses and the cylinder designation, both numerical values being stored in digital form over a substantial length of time. The engine speeds for the particular cylinders computed from those two numerical values being graphically displayed in the time sequence of the ignitions as an electronically generated stationary image.

13 Claims, 2 Drawing Sheets

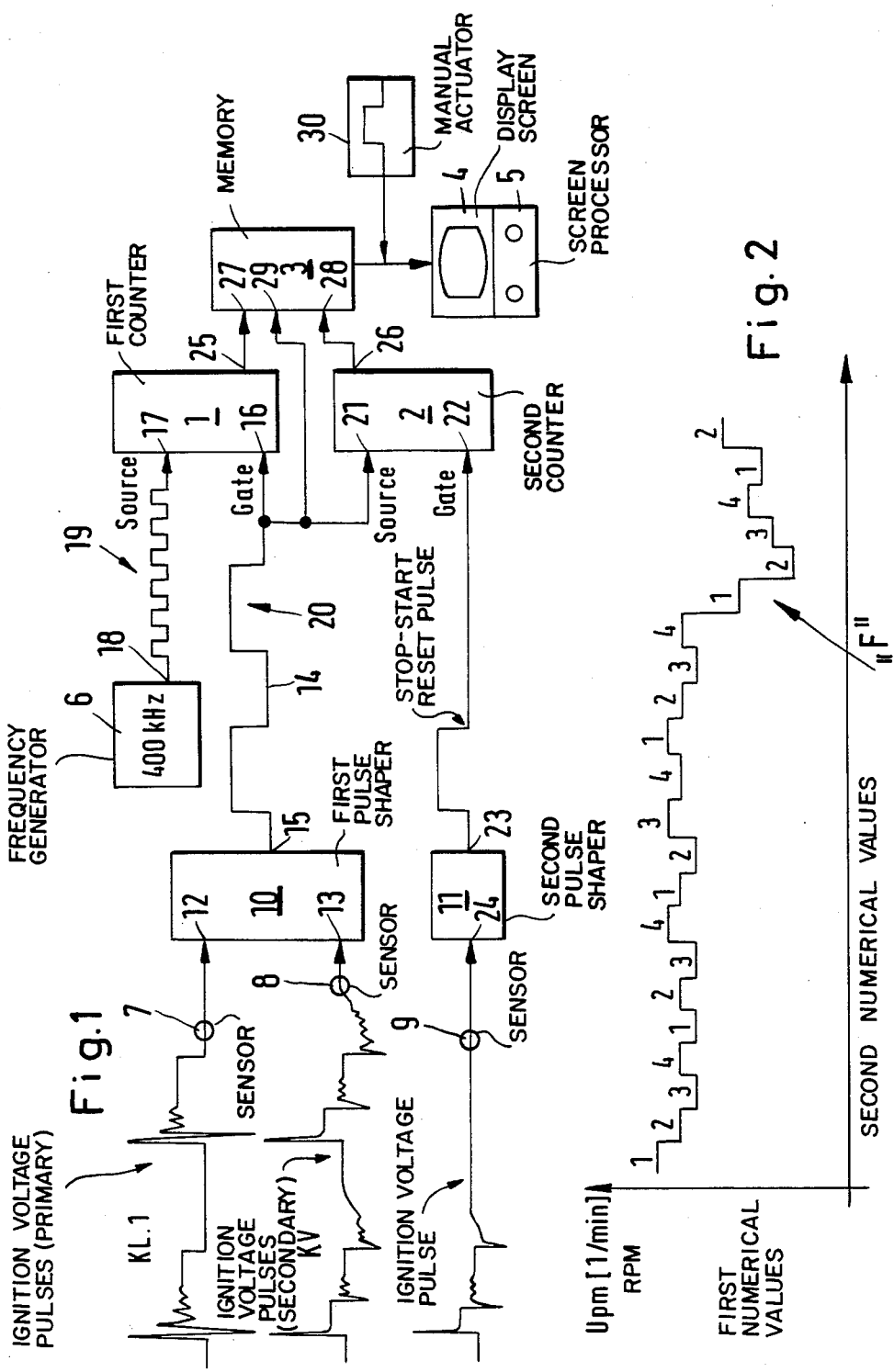

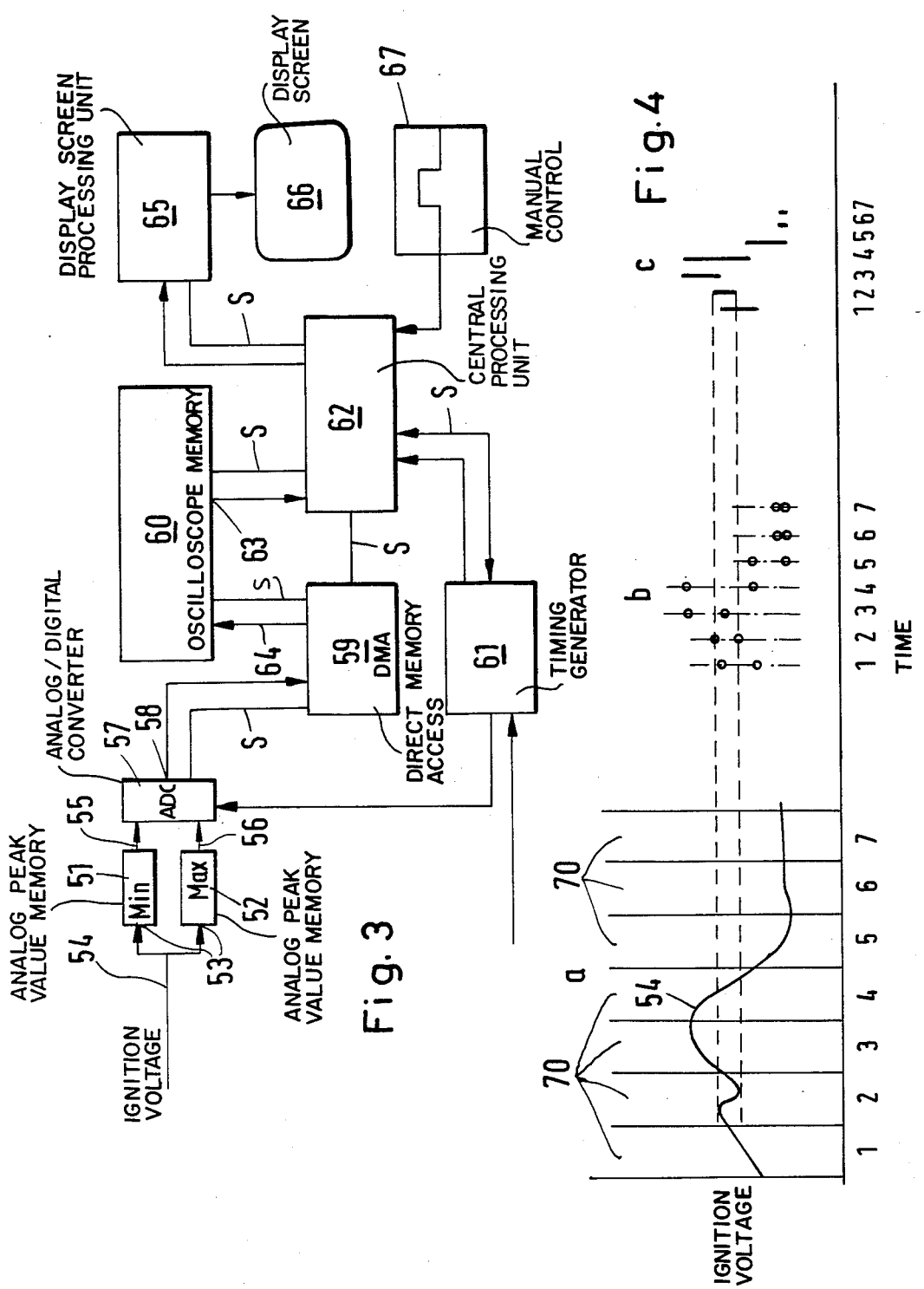

METHOD AND APPARATUS FOR ANALYZING THE PERFORMANCE OF THE ELECTRONIC IGNITION OF AN INTERNAL COMBUSTION ENGINE

BACKGROUND OF THE INVENTION

1. Field of the Invention

The present invention concerns a method and apparatus for analyzing the operation of the electronic ignition of an internal combustion engine.

2. Description of Related Art

Electronic means for testing the performance on an internal combusion engine may be connected separately to corresponding connection clamps of the motor vehicle, or jointly connected to the vehicle by means of a diagnostic plug. Such an apparatus may be used to perform a number of diagnostic routines, for instance measuring engine speed, the timing angle, the ignition voltage, the time-function of the ignition voltage, the behaviour of the exhaust gas, the partial vacuum, etc. The ignition voltages of individual cylinders may be analyzed with an oscilloscope to determine the variation in voltage over time. The oscilloscope images enable an experienced user to ascertain the ignition voltage, the combustion voltage, the duration of combustion, the timing angle and the cam angle of an ignition system. The user may easily ascertain deviations from a predetermined value caused by, for example, an ignition voltage failure in a particular cylinder. This method, however, is limited to observing periodically reoccurring events that are present in each of a series of rapidly changing oscilloscope display screens. Nevertheless, an experienced user may determine the cause of ignition failure from the deviating ignition voltage plot.

Known engine testers, however, are incapable of detecting transient deviations of the ignition voltage. Such deviations manifest themselves, for instance, by occasional unbalanced operation or shaking of an idling engine.

SUMMARY OF THE INVENTION

The present invention relates to a method and apparatus for determining a reason, after the fact, for any deviation from normal engine operation and to simultaneously localize the cylinder responsible for the deviation.

The invention enables a user to detect even sporadic deviations in engine behavior from normal operation, and to ascertain which cylinder caused the sporadic deviation from normal operation and the resulting unbalanced running of the engine. In the method of the present invention, rather than continuously monitoring the engine speed and the ignition voltage behavior for each cylinder, the engine speed for each cylinder is sensed and stored in a readable memory. In this way, preceding speed fluctuations can be displayed and a specific cylinder causing the fluctuations can be identified. Alternatively, the ignition voltage behavior of each of the cylinders is recorded and stored in a readable memory so that preceding deviations in the ignition voltage of each cylinder can be displayed as a stationary image. If, for instance, the engine runs unbalanced, then it is possible for the user, for instance by actuating a push button, to interrupt the recording process and to "leaf back" through the recorded test date stored in the readable memory until he finds the source of trouble among the digitally recorded and stored engine speeds for each cylinder or among the ignition voltage function stored for each cylinder.

The angular speed of each cylinder is detected by accurately measuring the time interval between two consecutive ignition pulses and then storing this interval as a first numerical value which, together with a second numerical value identifying the cylinder, is stored in memory. Preceding pairs of numerical values for each cylinder stored in the memory can be graphically displayed as, for example, a bar graph so as to provide a simultaneous overview of preceding values of ignition pulse time intervals for each cylinder to determine which cylinder in the sequence of ignitions was responsible for the decrease in performance evidenced by the drop in angular speed of the cylinder, etc.

The present invention also contemplates an alternate embodiment wherein the engine speed per cylinder is not displayed, but rather the time interval between the ignition pulses is directly displayed without prior mathematical conversion. In this alternate embodiment, an increase in the time interval means that the angular speed of the associated cylinder has decreased and the cylinder is responsible for the drop in performance. The user can then check this cylinder and quickly ascertain the actual reason for the drop in performance, as may be caused by, for example, the ignition system ahead of the spark plug, or by the spark plug itself, or by the valves. Thus, the user can analyze the corresponding ignition behavior of any particular cylinder.

The method of analysis of the present invention comprises two parts, namely, a recording stage and an analysis stage. The first stage is a recording stage in which the time interval required for each ignition process is measured at the engine and stored (up to 8,000 values in the preferred embodiment), while a second counter, in parallel with the first, stores the cylinder designations identifying the cylinders corresponding to the ignition time intervals. The first stage continues until the user manually commences the second or analysis stage after an engine malfunction. In the second stage analysis the values stored during the recording stage are converted into an engine cylinder speed/cylinder identification value and are processed so as to be displayed as a stationary image on a screen. In obtaining the cylinder related measurement of engine speed, either a signal from the primary winding of the ignition coil or a signal from the secondary winding of the ignition coil is used as the trigger pulse. A counter (16 bits in the preferred embodiment) that operates at a constant frequency of, for example, 400 kHz, measures the time elapsing between two consecutive trigger slopes. At each consecutive trigger slope, the contents of the counter can be stored in a memory register where they can be processed by the main computer. Moreover, at each new trigger slope, the counter contents are reset to zero and the counter is restarted.

The number of pulses from the signal of a first selected cylinder is accumulated in a second parallel counter. These two sets of pulses and the conversion of the first set provide engine cylinder speed values and the cylinder associated with each speed value. Finally, the data is converted into a graphic display such as an oscilliscope image. It is possible to form a conventional display of sequentially preceding cylinder speed values, for example, several minutes of preceding data, until the drop of engine cylinder speed is found and shown graphically on the display screen. The same applies to prior ignition voltage functions which can be displayed on the screen.

Accurate time resolution is achieved by the counting signal of relatively high frequency, preferably 400 kHz or higher. Given sufficiently fine graphics resolution, deviations in engine cylinder speed down to a tenth of a percent can be distinguished.

In the recording of the ignition voltage function, this voltage is digitized with high resolution, each ignition pulse being resolved into about 450–500 time periods and thus into corresponding digital values stored in the memory. Furthermore, a minimum and a maximum digital value of the ignition voltage is recorded within each time period and stored as a pair of values, whereby two times the approximately 450 digital values per ignition voltage pulse are stored. Preferably the minimum and maximum values of ignition voltage for each period are electronically imaged as columns on the display screen and supplemented by vertical lines to permit an easy read out of the ignition voltage function.

A triggering signal, corresponding to the signal to begin writing the oscilloscope image on the display screen, is always initiated by the ignition signal for the first selected cylinder. If the input to the oscilloscope memory were totally dependent on the trigger signal, a failure of the ignition signal to reach a first cylinder would cause the defective event not to be recorded. As defective signals, however, are of the highest interest, a special procedure is applied to assure that such signal enter the oscillscope memory. Accordingly, the loading of the oscilloscope memory is independent of the trigger signal and the screen image production.

The memory is constantly loaded with event data (ignition images), the oldest event being eliminated from a memory register as the storage capacity is exceeded.

If the user presses a "store" key, the data output to the oscilloscope memory is interrupted by a direct memory access DMA controller so that the contents of the oscilloscope memory are frozen. The content of the oscilloscope memory is then made available to a main central processing unit for further processing and can be fed through a display processor in single images to the display screen. The output of the stored images to the screen proceeds as follows: For images with a triggering signal register address from the second counter (a kind of serial number) in the DMA, this address is used to compute the start of the image; if no address is present in the expected area of the triggering event (for instance because of ignition malfunction), the trigger event is reconstructed from the first counter image data and then utilized in computing the start of the image. Thus, the trigger event (for instance the ignition picture of the first cylinder) is reliably placed at the beginning of the picture, normally corresponding to its left edge of the image.

Because the trigger signal is processed in time-dependent manner, the central processing unit also receives data from the frequency generator at the arrival of a trigger pulse so that the instantaneous state of the DMA control at the time of the triggering event is transferred into the memory. After performing an internal computational and preparation process, the "begin" address of the memory to be transferred to the display screen processor is determined. Thus, the event leading to triggering appears on the display screen and is therefore not lost.

DESCRIPTION OF THE DRAWINGS

FIG. 1 is a block diagram of a circuit arrangement to sense the angular speed in each cylinder.

FIG. 2 is a plot (stationary image) of the analyzed engine speed in a cylinder.

FIG. 3 is a block diagram of a circuit arrangement for analyzing the behavior of the ignition voltage pulses.

FIG. 4 shows the conversion of the time-function of the ignition voltage by means of digitized pairs of minimum and maximum voltage values into the associated graphic representation of timing increments.

DETAILED DESCRIPTION OF THE PREFERRED EMBODIMENT

The apparatus, shown in a simplified schematic form in FIG. 1 comprises a first counter 1, a second counter 2, a memory 3, a display screen 4 following the memory with an associated screen processor 5, a frequency generator 6, sensors 7, 8, 9 and pulse shaping stages 10, 11 following these sensors.

Conventional ignition coils are known in the art. Such ignition coils are in fact transformers with a primary coil and a second coil wound on the same core. When current is supplied to the primary coil, energy is supplied in the magnetic core. When the current in the primary coil is rapidly switched off, current is immediately created in the secondary coil. In the present invention, a signal KL1 from the primary side of the ignition coil or a signal KV from the secondary side of the ignition coil may be used to produce the pulses 14 to the first counter 1.

These components are connected as follows: sensors 7 and 8 are connected to inputs 12 and 13 of the pulse shaping stage 10 which takes either the input or output signals or both from the respective primary or secondary coil of an ignition coil to shape either or both of them into square pulses which can be processed by the first counter 1. The square pulses are transmitted from the output 15 through the line 14 to the start-stop-reset input 16 of the first counter. The counting input 17 of the first counter 1 is connected to an output 18 of the frequency generator 6, whereby the sequence of square pulses 19 produced at a frequency of 400 kHz by the frequency generator 6 are counted into the input 17 of the first counter 1 as long as the output 15 of the pulse shaping stage 10 applies a pulse 20 from the shaper 10 to the stop-start-reset input 16 of the first counter 1 so as to keep it in the counting mode. In other words, a number of square pulses 19 corresponding to the time interval between two successive voltage pulses interrogated by the sensors 7 or 8 is counted into the input 17 of the counter 1.

The counting input 21 of the second counter 2 also is connected to the output 15 of the pulse shaper 10. The start-stop-reset input 22 of the second counter 2 is connected to the output 23 of the second pulse shaper 11 of which the input 24 is connected to the sensor 9 functioning in concert with the ignition cable of a selected cylinder such as the first cylinder. Accordingly, the second counter 2 counts by "1" for every pulse at either of sensors 7 or 8 until being reset to "1" by the start-stop-reset input 22 when there is a pulse at sensor 9 and the counter 2 begins to count again. The particular count present at any time in the counter 2 indicates the cylinder designation (for instance numerals 1–6 in a six cylinder engine) which corresponds to the engine cylinder speed data of counter 1. The counters are preferably located in a processor (not shown). These two count values generated by the first and second counters are then stored in the memory 3, where the outputs 25 and 26 of the first and second counters are connected to the inputs 27, 28 of the memory 3. The counting and memory storing processing can be frozen by a manual actuation device 30 and the presently stored memory contents can be sequentially arranged to appear as a stationary image on the display screen 4, as shown in FIG. 2. The stationary image shows the preceding values of engine speed in each cylinder, in arbitrary units, as a bar graph. When called up in time, the bar graph can be scanned forward or backward until the operator has found the reason for the deviation in engine operation, for example, the drop in speed caused by engine shaking shown as a collapse of the otherwise fairly constant curve in FIG. 2. In this case, it was the cylinder 1 which caused the fluctuation in engine speed (location "F" in FIG. 2).

Furthermore, FIG. 1 shows that other components, such as a central processing unit, (not shown), are required for the functions of memory addressing, converging the input signals etc. These additional circuit components have been omitted for the sake of clarity but are familiar to one having ordinary skill in the art.

The apparatus for the time-delayed analysis of the ignition voltage function shown in FIG. 3 comprises two analog peak value memories 51, 52 receiving at their inputs 53 a signal representing the ignition voltage 54, while their outputs 55, 56 are connected to an analog to digital converter ADC 57. The output 58 of the ADC 57 is connected to an addressing device, such as a direct memory access (DMA) controller 59, which serves to address voltage values output by the ADC to memory registers or instruct a memory unit, such as the oscilloscope memory 60. A conventional engine speed dependent pulse generator, such as a timing generator 61, provides the time increments 70 for which the maximum and minimum voltage values are recorded by the peak memories 51, 52 and supplied by the ADC 57 for their subsequent sequential storage in the memory 60, by generating a plurality of timing increment control pulses for each ignition voltage pulse and supplying the timing control pulses to the units connected with it, such as the ADC 57 and the central processing unit 62. The central processing unit 62 is connected to an output 63 of the oscilloscope memory 60 to retrieve the pairs of voltage values (i.e. data values) supplied by the analog to digital converter ADC 57 for each time increment 70 and read by the DMA controller 59 through the line 64 into the oscilloscope memory. The voltage values represent the time function of the ignition voltage and are displayed with a display screen processing unit 65 onto the screen 66.

The lines denoted by "S" in FIG. 3 are control lines which carry a synchronization signal generated by the timing generator to synchronize the various units.

Portions a-c of FIG. 4 show the processing of the ignition voltage function. First the ignition voltage 54 is subdivided by the timing generator 61 into timing increments 70, comprising, for example, 448 elements. Within each time element the minimum and maximum value is sensed by the particular peak value memory 51 and 52 and recorded, as illustrated by portion b of FIG. 4. The ignition voltage values are shown in portion b in the form of pairs of dots for the time element 70. These minimum and maximum values are digitized by the analog to digital converter 57, fed to the DMA controller 59 which addresses them to the oscilloscope memory 60. When called up, for instance by the manual control 67, these values are transferred to the display screen 66. The minimum and maximum points (dots in portion b of FIG. 2) are joined togehter in the screen processor 65 by parallel and vertical lines in order to make possible easy read out of the ignition voltage function.

A cylinder designation also may be displayed on the display screen according to the apparatus of FIG. 1 when the ignition voltage is scanned at the ignition cables of the various cylinders.

The above described method permits the selective recording and analysis of previous cylinder and engine speed values, as well as the selective recording and analyzing of the cylinders and previous ignition voltage functions with high resolution. Each set of data may be used alone; however, in the present invention the user of both sets of data complements an overall procedure whereby the user may perform a comprehensive operational analysis on an internal combustion engine. Illustratively, if the operator finds from the selective recordings of engine cylinder speed and cylinder identification that a particular cylinder has caused a fluctuation in engine speed, then the user should inquire further into the stored ignition voltages of that cylinder and thereby determine whether the fluctuation in engine speed is caused by, for example, a collapse in the ignition voltage. If however, upon examining the cylinder and the ignition voltage, it is found that no collapse occurred in the ignition voltage, then other sources of malfunction, such as mechanical defects in the cylinder head or in the valve region, may be searched methodically and either or both of the test methods may be repeated in a continuous check on the operational state of the engine.

The preferred embodiment and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the invention. Accordingly, the foregoing detailed description should be considered exemplary in nature and not as limiting to the scope and spirit of the invention set forth in the appended claims.

What is claimed is:

1. A method for electrically sensing the operational state of a multiple cylinder internal combustion engine having an electronic ignition system comprising the steps of:
  (a) generating in sequence a first set of numerical values related to engine speed, said generation including measuring a time interval between consecutive ignition voltage pulses supplied to different cylinders;
  (b) generating in sequence a second set of numerical values representing each of the engine cylinders supplied an ignition voltage pulse by counting the number of ignition pulses supplied to said cylinders of said engine and resetting a value of said second set of numerical values to "1" at each occurance of an ignition voltage pulse supplied to a selected cylinder;
  (c) storing in a memory said first and second numerical values in digital form for a predetermined length of time greater than the length of time of any one ignition pulse, where each sequential numerical value of the first set stored in memory is associated with a corresponding sequential numerical value of the second set stored in the memory;

(d) converting said first set of numerical values in a computer into a set of speed values, each representing the engine speed for the cylinder represented by the associated second value;

(e) displaying said set of speed values with their associated second set values in sequence in graphical form as a stationary electronic image wherein said stationary electronic image is in the form of a bar graph comprising a plurality of bars arranged in sequence, with each bar representing an absolute value of engine speed associated with a particular cylinder.

2. A method as claimed in claim 1 wherein high frequency count pulses are generated at a constant frequency and counted between a start counter signal and a stop counter signal produced by the consecutive ignition voltage pulses in generating said first set of numerical values, said start counter signal and said stop counter signal being derived from a specific slope of said consecutive ignition voltage pulses supplied to said cylinders.

3. A method as claimed in claim 2 wherein in generating said second set of numerical values said ignition voltage pulses are counted by a second counter, and a stop-start pulse supplied to said second counter is derived from an ignition voltage pulse of said selected cylinder.

4. A method as claimed in claim 2 wherein the constant frequency of said generated count pulses exceeds 100 kHz.

5. A method as claimed in claim 1 wherein said first set of numerical values is generated by a first counter and is transferred to said memory so as to permit manual recall of said first set of numerical values in said stationary electronic image display, said first set of numerical values being generated by the sensing of a predetermined slope of an ignition voltage pulse supplied to said engine cylinders.

6. A method for analyzing an operational state of a multiple cylinder internal combustion engine having an electroni ignition, comprising the steps of: generating a sequence of data values representing time, each relating an ignition voltage pulse supplied to a cylinder to time; storing a plurality of said generated data values in a memory; and selectively displaying one of said plurality of data values and asertaining the defective ignition or ignition failure of a cylinder.

7. A method as claimed in claim 6 further including the steps of: generating in sequence first numerical values by high resolution time measurement of ignition voltage pulses; generating in sequence second numerical values simultaneously with generating said first numerical values by counting a number of ignition voltage pulses and recording in a memory a cylinder designation for each pulse, one of said second numerical values being reset to "1" by counting an ignition pulse to a selected cylinder.

8. A method as claimed in claim 7 further comprising the steps of: dividing each ignition voltage pulse duration into time increments of substantially equal duration; ascertaining for each time increment a maximum and minimum value of said ignition voltage pulse; generating digital signals for said maximum and minimum values of voltage pulse for each time increment and graphically displaying the digitalized maximum and minimum voltage pulse values in time sequence as mutually parallel vertical lines or columns extending between the ascertained maximum and minimum voltage values.

9. A method as claimed in claim 8 wherein previously displayed graphical displays are stored in memory and may be manually selected and displayed.

10. An apparatus for electrically sensing the operational state of a multli-cylinder internal combustion engine having an electronic ignition system comprising: first counter means operatively connected to the electronic ignition system for generating in sequence first numerical values related to engine cylinder speed including means for determining a time interval between first and second consecutive ignition voltage pulses supplied to different cylinders; second counter means operatively connected to the electronic ignition system for generating in sequence second numerical values by counting the number of ignition pulses supplied to said cylinders of said engine, and arranged to reset a second numerical value to "1" at each counting of an ignition pulse supplied to a selected cylinder; memory means operatively connected to said first and second counter means for storing said first and second numerical values in digital form for a predetermined length of time greater than the length of time to supply an ignition pulse to any one cylinder; computer means operatively connected to said memory means and arranged to convert said first numerical values into engine speed values representing a value of engine speed for each cylinder; and display means operatively coupled to said computer means and arranged to display said engine speed values in graphical form as a stationary image, said stationary image comprising said engine speed values arranged in sequential order of cylinder ignitions.

11. An apparatus as claimed in claim 10 whrein said said first counter means for generating said first numerical values comprises: a frequency generator for generating high frequency count pulses at a constant frequency; a pulse shaper arranged to receive ignition voltage pulses and generate a start counter pulse and a stop counter pulse on receiving consecutive ignition pulses; and a counter arranged to receive said count pulses from said frequency generator and said start counter pulse and stop counter pulse from said pulse shaper and count said frequency count pulses received between a start counter pulse received and a stop counter pulse received.

12. An apparatus for analyzing an operational state of a multi-cylinder internal combustion engine having an electronic ignition, comprising: means operatively connected to the electronic ignition for generating in sequence data values representing time relating an ignition voltage pulse supplied to a cylinder to time; memory means in operative communication with said generating means for storing a plurality of said data values and display means in operative communication with said memory means for displaying said plurality of said data values for enabling defective ignition of ignition failures of a cylinder to be ascertained.

13. An apparatus as claimed in claim 12 further comprising: first means operatively connected to said electronic ignition for generating in sequence first numerical values by a high resolution time measurement between consecutive ignition voltage pulses; second means operatively connected to said electronic ignition for generating in sequence second numerical values simultaneously with the generation of said first numerical values by counting a number of ignition voltage pulses and generating a cylinder designation value for each pulse, and arranged to reset one of said second numerical values to "1" at a counting of an ignition pulse to a selected cylinder; memory means operatively connected to said first and second generating means for associating said second numerical values with said first numerical values; and display means operatively connected to said memory means for displaying a functional relation of said first and second numerical values with respect to time.

* * * * *